United States Patent

Cubalchini

[11] Patent Number: 5,549,328
[45] Date of Patent: Aug. 27, 1996

[54] ROLL CONTROL SYSTEM

[75] Inventor: Joseph Cubalchini, St. Charles, Ill.

[73] Assignee: Gabriel Ride Control Products, Inc., Pulaski, Tenn.

[21] Appl. No.: 373,016

[22] Filed: Jan. 17, 1995

[51] Int. Cl.⁶ .................................................. B62D 9/02
[52] U.S. Cl. ........................ 280/772; 280/689; 280/723; 280/112.2
[58] Field of Search .................. 280/772 O, 689, 280/723, 112.2, 707, 709, 714, 702, 695, 700; 267/191, 277, 218

[56] References Cited

U.S. PATENT DOCUMENTS

| | | | |
|---|---|---|---|
| 3,608,925 | 9/1971 | Murphy | 280/112.2 |
| 4,892,329 | 1/1990 | Kozaki et al. | 280/772 |
| 5,161,822 | 11/1992 | Lund | 280/710 |
| 5,217,245 | 6/1993 | Guy | 280/689 |
| 5,362,094 | 11/1994 | Jensen | 280/772 |

FOREIGN PATENT DOCUMENTS 0085006  3/1990  Japan ................................. 280/689

*Primary Examiner*—Christopher P. Ellis
*Attorney, Agent, or Firm*—McAndrews, Held & Malloy, Ltd

[57] ABSTRACT

A roll control system for countering the rolling forces generated by a vehicle. The hydraulically operated roll control system is activated by the vehicular speed and steering angle equalling or exceeding predetermined threshold values.

2 Claims, 2 Drawing Sheets

ROLL CONTROL SYSTEM

BACKGROUND OF THE INVENTION

The present invention relates to a roll control system for countering the roll forces generated by a vehicle and, more particularly, to a hydraulically-operated roll control system that is activated by a threshold vehicle speed and steering angle.

Vehicle suspension systems are well known and typically comprise springs and dampers connecting the wheels to a vehicle body. These components support the mass of the vehicle and isolate the unevenness of the road surface from the vehicle passengers. When the vehicle turns, the suspension system permits the vehicle body to rotate slightly about its horizontal, longitudinal axis in response to the rolling force exerted on the vehicle body during the turn.

Further stabilization and control against the rolling force that occurs during turning has been achieved through the use of a stabilizer or anti-roll bar. For example, U.S. Pat. No. 5,161,822 discloses front and rear anti-roll bars which are connected to control arms on which the front and rear wheels are mounted. A hydraulically-operated roll control system is connected to the anti-roll bar to impart added roll correction while limiting the maximum displacement of the pistons in the roll control system, which in turn, limits the amount of correction afforded by the system.

Although the system described in U.S. Pat. No. 5,161,822 is useful, the art continues to seek improvements. One improvement is to provide a semi-active roll control system that counters the roll forces that are generated during turns but which can uncouple the anti-roll bar when cornering forces are not present.

SUMMARY OF THE INVENTION

One of the principal objects of the invention is therefore to provide an improved roll control system for a vehicle.

Another object of the invention is to provide a hydraulically-operated roll control system that is not activated unless cornering forces requiring roll control are present.

A further object of the present invention is to provide a roll control system that is activated when a threshold vehicle speed and steering angle are reached.

Another object of the present invention is to provide a roll control system that can be used with a conventional anti-roll bar.

Still another object of the present invention is to provide a roll control system having (a) a hydraulic actuator comprising a double acting piston disposed within a working cylinder and dividing the cylinder into first and second fluid chambers, the actuator acting between an anti-roll bar and an axle of the vehicle; (b) means for generating electronic signals indicative of vehicle speed and of vehicle turn direction; and (c) a hydraulic circuit supplying fluid to the hydraulic actuator, the hydraulic circuit including a first directional control valve responsive to the electronic signals generated, the first directional control valve regulating fluid flow to the first fluid chamber, and a second directional control valve responsive to the electronic signals generated, the second directional control valve regulating fluid flow to the second fluid chamber.

These and other objects, advantages and benefits will become apparent from reading the following description of the invention with reference to the accompanying drawings.

DETAILED DESCRIPTION OF THE PREFERRED EMBODIMENT

Figure 1:
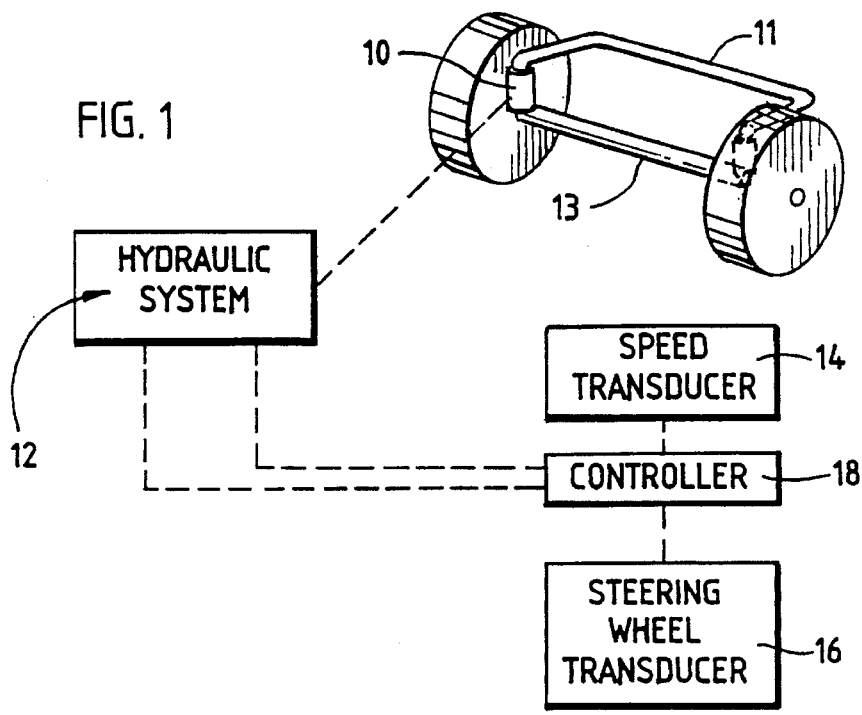
FIG. 1 is a schematic representation of a roll control system of the present invention incorporating a hydraulic actuator connected between an anti-roll bar and an axle.

Referring to FIG. 1, the roll control system of the present invention includes an anti-roll bar actuator 10 which connects a conventional anti-roll bar 11 to the axle 13 of a vehicle. In general, the actuator 10 replaces one of the conventional anti-roll bar links that connects the anti-roll bar 11 to the vehicle axle 13. The actuator acts on one end of the anti-roll bar to twist the anti-roll bar thereby countering vehicle roll.

A hydraulic circuit, generally designated 12, delivers pressurized fluid to the actuator 10 in response to a threshold combination of vehicle speed and steering angle that would cause the vehicle to roll. In general, the threshold vehicle speed will be in the range of 7–18 m.p.h. and the threshold angle of rotation will be at least 5° from straight ahead, in either direction. The speed range and rotation angle may, however, be varied particularly for different automobile models. A controller 18 receives the vehicle speed and steering angle inputs from a vehicle speed transducer 14 and a steering wheel transducer 16, respectively, and is electrically connected to and controls the hydraulic circuit 12. When the controller 18 detects a vehicle speed and steering angle combination that would cause the vehicle to roll, it delivers signals to the hydraulic circuit 12 which allows pressurized fluid to be selectively delivered to the actuator 10. The actuator 10 then appropriately twists the anti-roll bar 11 to counter the roll.

When the combination of vehicle speed and steering angle fail to reach the threshold level, or if the vehicle is equipped with a manual override which is selected, the roll control system is not actuated. When the system is not actuated, the actuator 10 is permitted to "float" so as not to restrict or influence the movement of the anti-roll bar 11. This is achieved by porting the hydraulic fluid from one side of the actuator 10 to the other side, as is more clearly explained herein with reference to FIG. 2.

Figure 2:
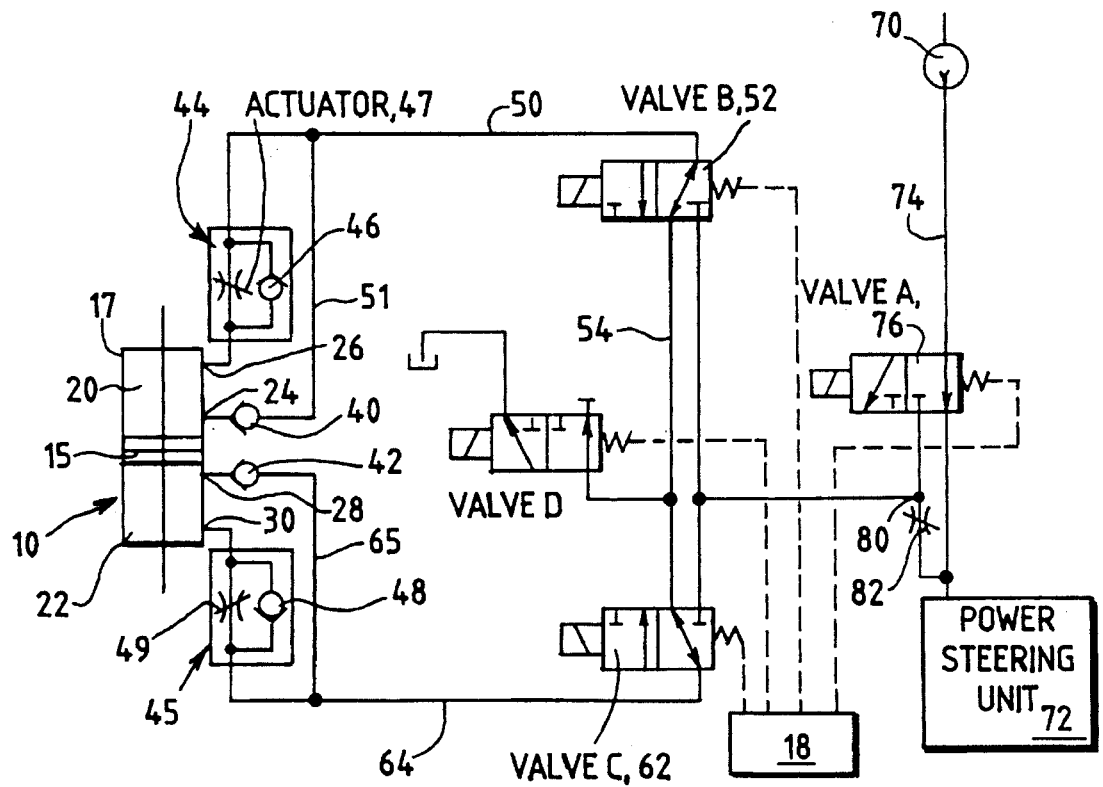
FIG. 2 is a hydraulic circuit representation illustrating the roll control system in its non-actuated state.

Referring now to FIG. 2, the actuator 10 is a double acting hydraulic piston and cylinder assembly. The assembly includes a reciprocating piston 15 disposed inside a working cylinder 17. The piston divides the interior of the working cylinder 17 into a first fluid chamber 20 and a second fluid chamber 22. The first fluid chamber 20 includes a first port 24 and a second port 26, and the second fluid chamber 22 also includes a first port 28 and a second port 30. The first ports 24 and 28 of the first and second fluid chambers, respectively, are connected to conventional check valves 40 and 42, respectively. The second ports 26 and 30 are connected to conventional directional flow control valves 44 and 45, respectively. The directional flow control valve 44 includes a check valve 46 and a normally preset restriction 47, while directional flow control valve 45 includes a check valve 48 and a normally preset restriction 49. The purpose and function of the directional flow control valves 44 and 45 will be more fully described below.

When the system is not actuated, as shown in FIG. 2, the first fluid chamber 20 of the actuator 10 is connected to the second fluid chamber 22 through an open flow path via a fluid line 50 and 51, a conventional directional control valve 52, a fluid line 54, a conventional directional control valve 62, a fluid line 64 and 65, and check valves 40 and 42, in lines 51 and 65, respectively. The directional control valves 52 and 62 are preferably conventional solenoid valves and are conventionally electrically connected to and controlled by the controller 18.

A fluid pump 70 supplies the hydraulic fluid for the roll control system. Preferably, the fluid pump 70 is a conventional fluid pump which supplies fluid to the power steering unit 72 of the vehicle although for enhanced safety, it may be a dual chambered power steering pump, with one of its chambers powering the power steering and the other chamber powering the system. As illustrated in FIG. 2, the fluid pump 70 delivers hydraulic fluid via a supply line 74 through a conventional directional control solenoid valve 76 to the power steering unit 72 when the solenoid valve 76 is inactive. The solenoid valve 76 is also electrically connected to and controlled by the controller.

When the vehicle speed and steering angle are below the threshold that would cause the vehicle to roll, the solenoid valves 76, 52 and 62 are not energized or actuated. In this mode, only the power steering unit 72 receives hydraulic fluid from the pump 70 because the solenoid valves 52 and 62 block delivery of hydraulic fluid to the roll control system. The non-energized solenoid valves 52 and 62 allow fluid to flow between the first and second fluid chambers 20 and 22 of the actuator 10.

When the controller 18 receives vehicle speed and steering angle inputs that indicate that both the threshold speed and threshold angle of rotation have been reached, the controller energizes the valve 76 and either the directional control valve 52 or the directional control valve 62, depending upon the steering rotation angle direction.

Figure 3:
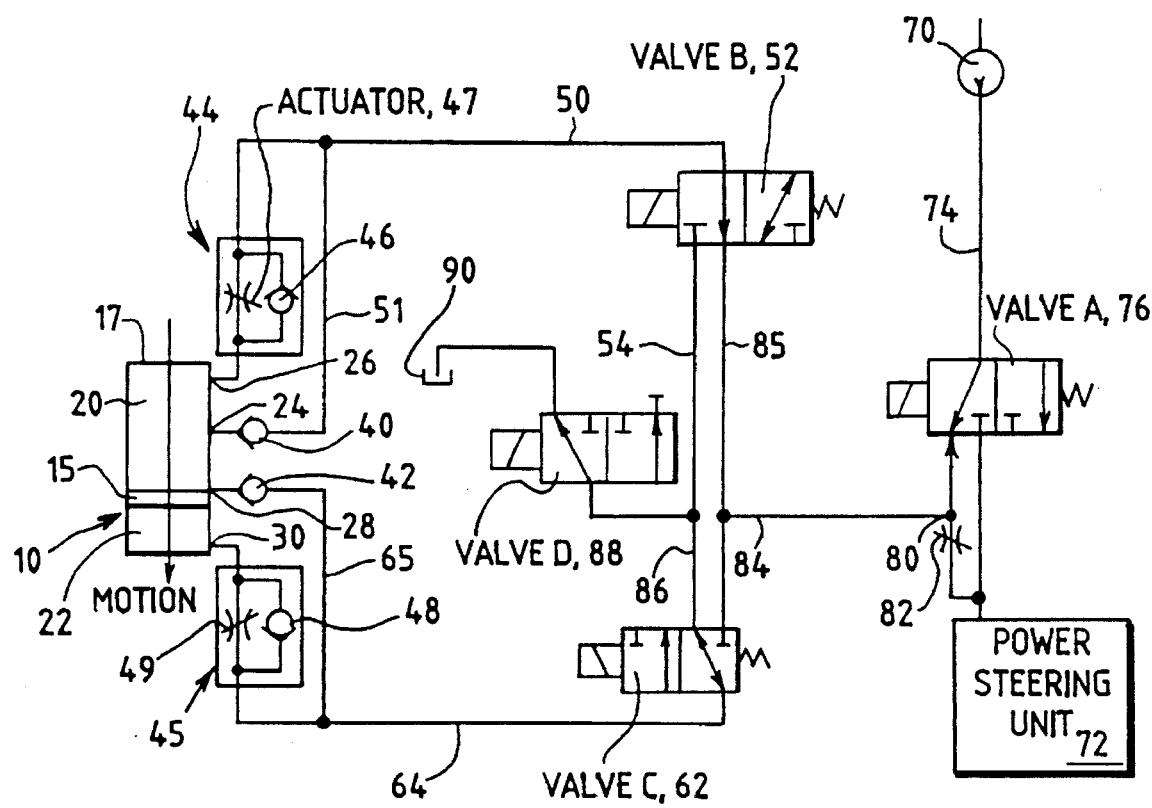
FIG. 3 is a hydraulic circuit representation illustrating the roll control system in an actuated state.

FIG. 3 illustrates the hydraulic circuit when directional control valve 52 is energized. As shown in FIG. 3, hydraulic fluid flows from the pump 70 through the solenoid valve 76 to a "T" fitting 80. From the "T" fitting 80, the fluid flows through a conventional variable flow control valve 82 to the power steering unit 72. The variable control valve 82 controls the pressure in the roll control hydraulic circuit. Increasing the restriction in the control valve 82 increases the working pressure in the roll control system. The variability in the flow control valve 82 can be either electrically or mechanically controlled.

Fluid under pressure flows from the "T" fitting 80 through fluid lines 84 and 85, where it flows through energized directional control valve 52, fluid lines 50, and directional flow control valve 44 into the upper chamber 20 of the actuator 10. The pressurized fluid acts on the piston of the actuator, causing the piston 15 to move downwardly as shown in FIG. 3. The movement of the piston 15 of the actuator acts on the anti-roll bar, causing the anti-roll bar to twist or deflect and thereby increase the positive roll stiffness of the vehicle.

As the piston moves downwardly (as shown in FIG. 3), the first port 28 of the second fluid chamber 22 is uncovered, allowing the fluid to flow via the check valve 42 to fluid lines 64 and 65, through directional control valve 62 to fluid line 86. The fluid then flows through a conventional solenoid valve 88 to a conventional fluid reservoir 90. The solenoid valve 88 is electrically connected to and controlled by the controller 18 and is energized by the controller when the threshold combination of vehicle speed and steering angle is detected by the controller.

Under some driving conditions, wheel motion, relative to the vehicle body, may drive the actuator piston 15 to the end of the cylinder 17, thereby causing damage to the actuator piston and cylinder assembly. To prevent this, the conventional directional flow control valves 44 and 45 force the fluid to flow through the restrictions 47 and 49, thereby providing a hydraulic cushion between the piston 15 and the end of the cylinder 17.

Although the present invention has been described with reference to a preferred embodiment, those skilled in the art will recognize that changes and modifications may be made without departing from the spirit and scope of the invention, which is limited only by the following claims.

What is claimed is:

1. An improved roll control system for countering the roll forces generated by a vehicle that is capable of being driven at variable speeds and turned while being driven and that includes an anti-roll bar and an axle, the improved system comprising:

(a) a hydraulic actuator comprising a double acting piston disposed within a working cylinder and dividing the cylinder into first and second fluid chambers, with the actuator acting between the anti-roll bar and the vehicle axle;

(b) means for generating an electronic signal indicative of vehicle speed and vehicle turn direction; and (c) a hydraulic circuit supplying fluid to the hydraulic actuator, the hydraulic circuit including a first directional control valve responsive to the electronic signal generated, the first directional control valve regulating fluid flow to the first fluid chamber, a second directional control valve responsive to the electronic signal generated, the second directional control valve regulating fluid flow to the second fluid chamber, a third directional control valve that includes a fluid flow restrictor and that is disposed between the first end of the working cylinder and a fluid reservoir, and a fourth directional control valve that includes a fluid flow restrictor and that is disposed between the second end of the working cylinder and the fluid reservoir whereby the third and fourth directional control valves provide a hydraulic cushion between the piston and the first and second ends, respectively, of the working cylinder.

2. The improved system of claim 1 wherein the signal generating means generates a signal when the vehicle speed and vehicle turn direction both equal predetermined thresholds.

\* \* \* \* \*